July 14, 1936. E. H. KREMER 2,047,639
BELT CONNECTER
Filed May 13, 1935
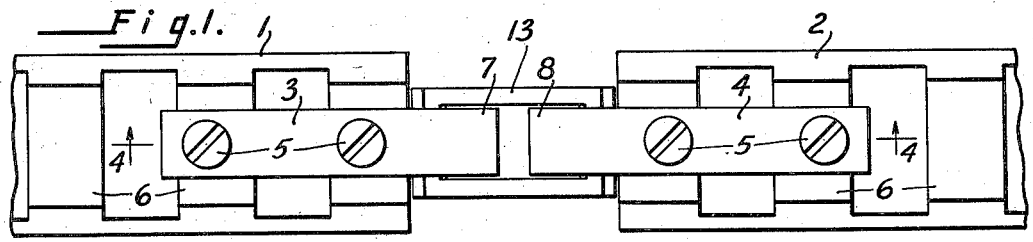
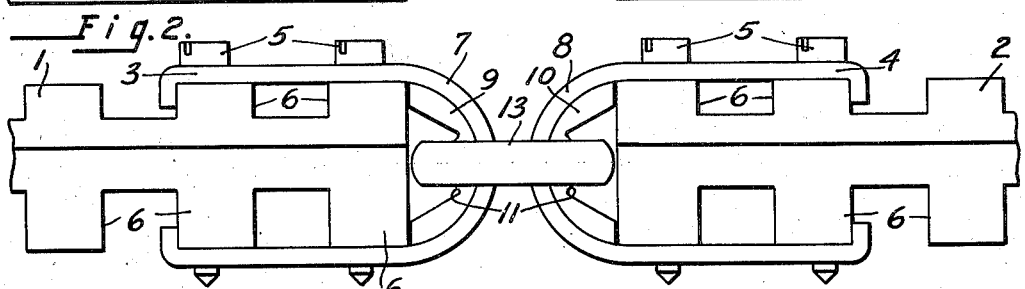
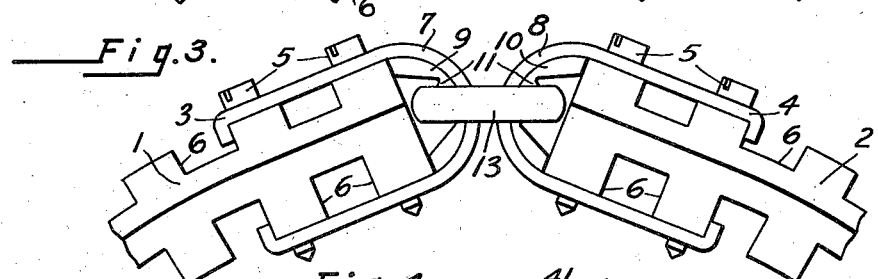
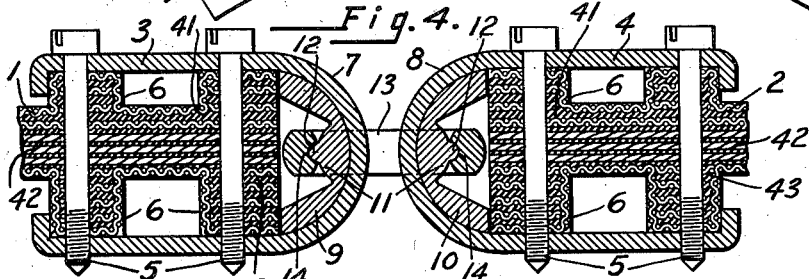
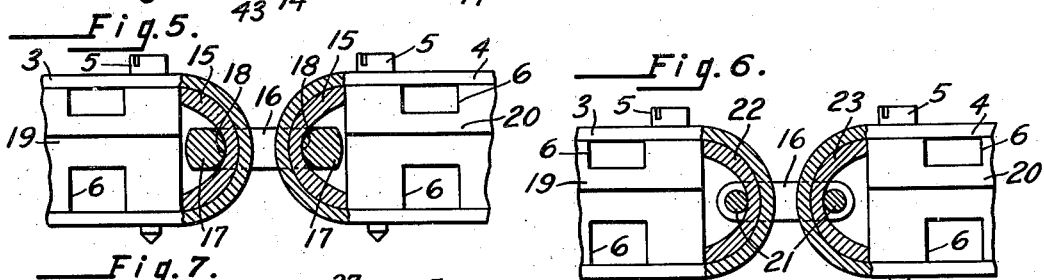
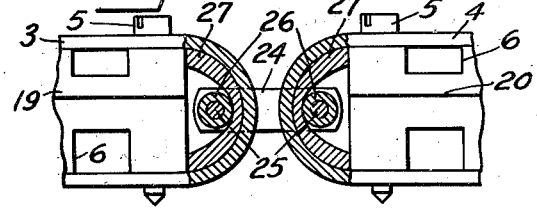
INVENTOR
EDWARD H. KREMER.
BY
Toulmin & Toulmin
ATTORNEYS Patented July 14, 1936

2,047,639

UNITED STATES PATENT OFFICE 2,047,639

BELT CONNECTER

Edward H. Kremer, Dayton, Ohio, assignor to The Dayton Rubber Mfg. Company, Dayton, Ohio, a corporation of Ohio Application May 13, 1935, Serial No. 21,216

23 Claims. (Cl. 24—33)

This invention relates to belt connecters, and in particular, to such connecters having pivoting members arranged between the ends of the belt.

One object of this invention is to provide a belt connecter having belt clamps interconnected by a link having pivotal engagement with each clamp.

Another object is to provide a belt connecter wherein each belt clamp contains a bearing member, the opposite bearing members being interconnected by a link having pivotal engagement and preferably a fulcrum engagement therebetween.

Another object is to provide a belt connecter consisting of a pair of clamps with approximately semi-circular ends, a pair of approximately crescent-shaped bearing members inserted between the clamps and the ends of the belt, and a link having pivoting or rolling contact with the bearing members in the opposite clamps so as to interconnect the clamps by a pivoting engagement therebetween.

In the drawing:

Figure 1 is a top plan view of the belt connecter of my invention shown as connecting the ends of a hexagonal belt.

Figure 2 is a side elevation of the belt connecter and belt shown in Figure 1.

Figure 3 is a side elevation similar to Figure 2, but with the belt ends and belt connecter parts angled relatively to one another, as in passing over a pulley of small diameter.

Figure 4 is a longitudinal, vertical section along the line 4—4 of Figure 1.

Figure 5 is a section similar to Figure 4, but showing a modified form of belt connecter.

Figure 6 is a view similar to Figure 5, but showing a still further modified form of belt connecter.

Figure 7 is a view similar to Figure 6, showing another form of belt connecter.

Referring to the drawing in detail, Figure 1 shows the opposite ends 1 and 2 of a belt as possessing clamps 3 and 4 secured thereto by screws 5. The belt is provided with upper and lower notches 6, whereby to increase its flexibility and adaptability to surfaces of varying contour. The facing ends 7 and 8 of the belt connecter clamps are of approximately semi-circular outline and contain bearing members 9 and 10 of approximately crescent shape (Figures 2 and 4).

Each of the bearing members 9 and 10 is provided on its inner side with a projecting portion 11 having thereon a ridge 12. The ridges 12 face toward the ends of the belt and away from each other. Interconnecting the ridges 12 of the opposite clamps 3 and 4 is a link member 13, of substantially rectangular outline. The opposite ends of the link member 13, on their inner surfaces, are provided with grooves 14 arranged to pivotally receive the ridges 12. The bearing members 9 and 10 being of crescent shape are of such length that their outer ends engage or closely approach the ends of the belt ends 1 and 2, thereby holding the bearing members 9 and 10 in a fixed position.

In the assembly of the belt connecter shown in Figures 1 to 4, inclusive, the link 13 is slipped over the ends of the clamps 3 and 4 before the latter are applied to the belt ends 1 and 2, and the bearing members 9 and 10 are inserted between the ends 7 and 8 of the clamp members and the belt ends 1 and 2. The ridges 12 are then caused to engage the grooves 14 in the opposite ends of the link member 13. The tightening of the screws 5 causes the belt connecter to be securely attached to the belt ends 1 and 2.

The connecter shown may be employed with any suitable form of belt, but is shown as applied to a combined rubber and fabric belt of hexagonal cross section. Such belts are composed of alternate layers of rubber and fabric, this fabric being sometimes arranged in layers of different tensions.

In the operation of the belt connecter shown in Figures 1 to 4, as the belt ends 1 and 2 pass over pulleys of small diameter, the belt end 1 will tilt relatively to the belt end 2, as shown in Figure 3, causing the ridges 12 to tilt within the grooves 14 of the links 13. The belt and connecter assembly then approximately takes the form shown in Figure 3. When the belt has passed around the pulleys and enters the stretch between two pulleys, its ends return to the straight position shown in Figures 2 and 4. Consequently, the ends of the belt are constantly angled relatively to one another and then straightened out immediately afterward. This alternate angling and straightening of the belt ends is readily facilitated by the pivotal engagement between the opposite ends of the link member 13 and the bearing members 9 and 10.

In the modified form of belt connecter shown in Figure 5 the bearing member 15 is provided with an inner surface of arcuate cross section, this being engaged by a link member 16 having ends 17, with curved portions 18 engaging the bearing members. The curved portions 18 are preferably of a shorter radius of curvature than the inner curve of the bearing members 15. As a consequence when the belt ends 19 and 20 tilt relatively to one another, as in passing around a pulley of small diameter, the link member 16 will pivot with respect to the bearing members 15, this rocking action being effected by the fact that the ends 17 have a smaller radius of curvature than the inner surfaces of the bearing members 15.

In the modified form of belt connecter shown in Figure 6 the construction is similar to that shown in Figure 5, except that the end members 21 consist of cross rods of substantially cylindrical shape. These cross rods engage the inner surfaces of the bearing members 22 and 23 in a manner similar to the engagement of the parts shown in Figure 5.

The belt connecter assembly shown in Figure 7 is similar to that shown in Figure 6, with the exception of the fact that the link member 24 is provided with small cross rods 25 at its opposite ends, and these in turn, carry rollers 26 of hollow cylindrical form. The rollers 26 give a rolling and pivoting engagement with the bearing members 27, in a manner which will be obvious from an examination of Figure 7.

It will be understood that the bearing members referred to above are made separate from the clamping members in order that the former may utilize tool steel or other hard material for their construction, whereas the latter may employ ordinary steel. By this provision the inter-ploy engaging parts may be made of a hard, long-wearing steel, yet the clamps be made of low priced steel. It will be understood, however, that the belt clamps and the bearing members may be made integral in form of a single piece of material, if desired.

The belt preferably employed with the connecter of this invention consists, in its preferred form, of a laminated structure having combined layers of rubber and fabric with toothed portions 6 upon the under side of the belt. The belt roughly comprises three sections, the tension portion 41, a neutral axis portion 42 and a compression portion 43.

The tension portion 41 is placed at the outer side of the belt and the compression portion 43 at the inner side, with the toothed portions 6 projecting therefrom. The neutral axis portion 42, arranged between the tension portion 41 and the compression portion 43, consists of a plurality of strong inextensible cords impregnated in the rubber with or without suitable fabric. This neutral axis portion 42 is the portion of the belt which remains comparatively unchangeable in length as the belt passes around pulleys, whereas the tension portion 41 is arranged to elongate somewhat and the compression portion 43 to become compressed by a corresponding amount. By placing the fulcrum point of the belt connecter substantially opposite the neutral axis portion 42 and approximately on the same level thereof, the rocking action of the belt connecter is caused to take place on this neutral axis. This results in an improved performance of the belt together with increased efficiency, due to the absence of leverage or relative motion between the neutral axis layer and the fulcrum point.

It will be understood that I desire to comprehend within this invention such modifications as come within the scope of the claims and the invention.

Having thus fully described my invention, what I claim as new and desire to secure by Letters Patent, is:

1. In a belt connecter, a pair of unitary clamping members each adapted to be secured to one of the ends of a belt and to engage both the inner and outer surfaces of the belt, bearing members arranged between the nose portions of said clamping members and the ends of said belt, and a link engaging and interconnecting said bearing members.

2. In a belt connecter, a pair of unitary clamping members adapted to be secured to the ends of a belt and to engage both the inner and outer surfaces thereof, bearing members arranged between the nose portions of said clamping members and the ends of said belt, and a link engaging and interconnecting said bearing members, said link having pivotal engagement with said bearing members.

3. In a belt connecter, a pair of unitary clamping members adapted to be secured to the ends of a belt on the inner and outer surfaces thereof, means on the ends of said clamping members adapted to provide fulcrums, and a link pivotally engaging said fulcrums and interconnecting said clamping members.

4. In a belt connecter, a pair of clamping members adapted to be secured to the ends of a belt, means on the ends of said clamping members adapted to provide fulcrums, and a link pivotally engaging said fulcrums and interconnecting said clamping members, said fulcrums consisting of ridges engaged by corresponding grooves in said link.

5. In a belt connecter, a pair of clamping members adapted to be secured to the ends of a belt, separable bearing members arranged between the nose portions of said clamping members and the ends of said belt, and a link engaging and interconnecting said bearing members, said bearing members having pivotal portions thereon and said link having corresponding portions arranged to pivotally engage said pivotal portions.

6. In a belt connecter, a pair of clamping members adapted to be secured to the ends of a belt, bearing members arranged between the nose portions of said clamping members and the ends of said belt, and a link engaging and interconnecting said bearing members, said bearing members being of approximate crescent shape, said link pivotally engaging the concave surfaces of said bearing members.

7. In a belt connecter, a pair of clamping members adapted to be secured to the ends of a belt and having closed ends projecting beyond the ends of the belt, crescent-shaped bearing members arranged in the spaces between the ends of the clamping members and the ends of the belt, and means pivotally engaging each bearing member and interconnecting the opposite bearing members.

8. In a belt connecter, a pair of clamping members adapted to be secured to the ends of a belt and having closed ends projecting beyond the ends of the belt, crescent-shaped bearing members arranged in the spaces between the ends of the clamping members and the ends of the belt, each of said bearing members having a fulcrum ridge on the concave surface thereof, and means pivotally engaging each bearing member at the fulcrum thereof and interconnecting the opposite bearing members.

9. In a belt connecter, a pair of clamping members adapted to be secured to the ends of a belt and having closed ends projecting beyond the ends of the belt, crescent-shaped bearing members arranged in the spaces between the ends of the clamping members and the ends of the belt, each of said bearing members having a fulcrum ridge on the concave surface thereof, and a link having ridges on its opposite sides adapted to pivotally receive said fulcrums and interconnect the opposite bearing members.

10. In a belt connecter, a pair of clamping members adapted to be secured to the ends of a belt and having approximately semi-circular closed ends projecting beyond the ends of the belt, crescent-shaped bearing members arranged in the spaces between the ends of the clamping members and the ends of the belt, each of said bearing members having a fulcrum ridge on the concave surface thereof, and an approximately rectangular link having ridges on its opposite sides adapted to pivotally receive said fulcrums and interconnect the opposite bearing members.

11. In a belt connecter, a pair of clamping members adapted to be secured to the ends of a belt, bearing members arranged between the nose portions of said clamping members and the ends of said belt, the inner surfaces of said bearing members being concave in directions away from one another, and a link engaging said concave surfaces and interconnecting the opposite ends of the belt thereby.

12. In a belt connecter, a pair of clamping members adapted to be secured to the ends of a belt, bearing members arranged between the nose portions of said clamping members and the ends of said belt, the inner surfaces of said bearing members being concave in directions away from one another, and a link having portions of smaller radius of curvature engaging said concave suurfaces and interconnecting the opposite ends of the belt thereby.

13. In a belt connecter, a pair of clamping members adapted to be secured to the ends of a belt, bearing members arranged between the nose portions of said clamping members and the ends of said belt, and a link engaging and interconnecting said bearing members, said link having rollers at the points of said engagement.

14. In a belt connecter, a pair of clamping members adapted to be secured to the ends of a belt, bearing members of approximate crescent form arranged between the nose portions of said clamping members and the ends of said belt, and a link having rollers at its opposite ends, said rollers pivotally engaging said bearing members.

15. A belt connecter spacer and bearing member adapted to locate the connecter with respect to the belt comprising a crescent-shaped piece having a projection on the concave surface thereof, said bearing member being adapted to abut a belt end with the projection disposed toward the belt end.

16. A belt connecter bearing member comprising a crescent-shaped piece having a projection on the concave surface thereof, said projection being arranged upon a second projection at approximately the center of said concave surface.

17. In a belt connecter, a pair of clamping members adapted to be secured to the ends of a belt, bearing members arranged within the nose portions of said clamping members and abutting the adjacent ends of said belt, and a link engaging and interconnecting said bearing members, the nose portions of said clamping members being substantially semi-circular with the center of curvature thereof positioned approximately at the end of the belt engaged by said clamping members.

18. In a belt connecter, a pair of clamping members adapted to be secured to the ends of a belt, bearing members arranged within the nose portions of said clamping members and abutting the adjacent ends of said belt, and a link engaging and interconnecting said bearing members, the nose portions of said clamping members being substantially semi-circular with the center of curvature thereof positioned approximately at the end of the belt engaged by said clamping members, said center of curvature being located approximately in the neutral axis layer of the belt.

19. In a belt connecter, spaced opposed arcuate clamping members, and a connecting link interconnecting said clamping members and having roller bearing engagement on the inside of said clamping members.

20. In a belt connecter, a pair of clamping members adapted to be secured to the ends of a belt, said clamping members having oppositely spaced arcuate nose portions, a bearing insert of arcuate form arranged between each nose portion and the end of the belt adjacent thereto, and a link engaging and interconnecting said bearing inserts.

21. A belt clamping member assembly comprising a U-shaped clamping member having an arcuate end, and an arcuately formed bearing insert arranged between said clamping member end and the end of the belt.

22. A belt clamping member assembly comprising a U-shaped clamping member having an arcuate end, and an arcuately formed bearing insert arranged between said clamping member end and the end of the belt, the engaging surfaces between said clamping member and said bearing surface having substantially the same configuration.

23. A belt clamping member assembly comprising a U-shaped clamping member having an arcuate end, and an arcuately formed bearing insert arranged between said clamping member end and the end of the belt, the engaging surfaces between said clamping member and said bearing insert having substantially the same configuration, and the opposite face of the bearing insert having a different configuration from the configuration of the face engaging the clamping member.

EDWARD H. KREMER.